United States Patent [19]

Pociask

[11] Patent Number: 4,917,002

[45] Date of Patent: Apr. 17, 1990

[54] ACTUATING PISTON ASSEMBLY, AND COMPONENTS THEREOF, FOR TORQUE TRANSMITTING SYSTEMS

[75] Inventor: Michael B. Pociask, Martinsville, Ind.

[73] Assignee: General Motors Corporation, Detroit, Mich.

[21] Appl. No.: 281,362

[22] Filed: Dec. 8, 1988

[51] Int. Cl.⁴ .............................................. F01B 31/00
[52] U.S. Cl. ...................................... 92/107; 277/182; 277/183; 277/189; 192/85 AA
[58] Field of Search ............... 92/107, 108, 241, 240; 192/85 AA; 272/181, 182, 183, 189

[56] References Cited

U.S. PATENT DOCUMENTS

| | | | |
|---|---|---|---|
| 3,371,937 | 6/1965 | Maeda | 277/189 |
| 3,814,225 | 6/1974 | Martin | 92/107 |
| 3,972,346 | 8/1976 | Wormser | 92/108 |
| 4,608,826 | 9/1986 | Sawyer | 92/108 |

FOREIGN PATENT DOCUMENTS 1376381  9/1964  France ..................... 192/85 AA Primary Examiner—Edward K. Look
Assistant Examiner—John Ryznic
Attorney, Agent, or Firm—Donald F. Scherer

[57] ABSTRACT

An actuating piston assembly (10) for torque transmitting systems (11). The torque transmitting system (11) is encased within a housing member (12), and a mounting annulus (40) is presented from the housing member (12). The mounting annulus (40) has a radially outer, cylindrical surface (41) and a radially inner, cylindrical surface (42), the two surfaces (41 and 42) being preferably concentric. A seal retainer (45) is carried on the mounting annulus (40), and the seal retainer (45) has a substantially planar web portion (46). Outer and inner rims (50 and 51) are presented from the web portion (46) and frictionally engage the corresponding outer and inner surfaces (41 and 42) on the mounting annulus (40) to secure the seal retainer (45) thereto. A plurality of circumferentially spaced outer blocking flanges (52) extend radially outwardly from the outer rim (50), and a plurality of circumferentially spaced inner blocking flanges (53) extend radially inwardly from the inner rim (51). An outer seal (54) is secured between a the stop sruface (39) and the outer blocking flanges (52), and an inner seal (55) is similarly secured between the stop surface (39) and the inner blocking flanges (53). An annular, U-shaped piston (60) has a pair of radially spaced inner and outer skirt portions (62 and 63) which engage the inner and outer seals (55 and 54), respectively, to define a piston chamber (65).

5 Claims, 2 Drawing Sheets

ACTUATING PISTON ASSEMBLY, AND COMPONENTS THEREOF, FOR TORQUE TRANSMITTING SYSTEMS

TECHNICAL FIELD

The present invention related generally to torque transmitting systems in the nature of either brakes or clutches. More particularly, the present invention relates to actuating piston assemblies for torque transmitting systems. Specifically, the present invention relates to a novel and unique seal retainer ring particularly adapted for use with actuating piston assemblies employed in conjunction with torque transmitting systems.

BACKGROUND OF THE INVENTION

Torque transmitting systems are widely employed in automobile transmissions selectively to control, relative rotation between components of the transmission. As is well known to the art, one widely accepted form of an automatic, vehicular transmission employs compound planetary gear sets that utilize three clutch assemblies and two braking bands to preclude relative rotation between selected components in order to obtain the desired function of the compound planetary gear sets. The operator selects the driving range from the neutral, forward (either the standard drive, the "Intermediate" or the "Lo" forward selections) or reverse, and the transmission automatically changes gear ratios in relation to the vehicle speed and the engine torque input, as permitted within the range selected. Vehicle speed and engine torque signals are constantly fed to the transmission in a manner well known to the art in order to provide the proper gear ratio for maximum efficiency and performance at all throttle openings.

A planetary gear train consists of a center, or sun, gear, an internal gear and a planetary carrier assembly which includes and supports the smaller planet gears, or pinions. When the sun gear is held stationary and power is applied to the internal gear, the planetary gears rotate in response to the power applied to the internal gear and thus "walk" circumferentially about the fixed sun gear to effect rotation of the carrier assembly in the same direction as the direction in which the internal gear is being rotated.

When any two members of the planetary gear train rotate in the same direction and at the same speed, the third member is forced to turn at the same speed. For example, when the sun gear and the internal gear rotate in the same direction, and at the same speed, the planet gears do not rotate about their own axes but rather act as wedges to lock the entire unit together to effect what is known as direct drive.

Whenever the carrier assembly is restrained from spinning freely, and power is applied to either the sun gear or the internal gear, the planet gears act as idlers. In that way the driven member is rotated in the opposite direction as the drive member. Thus, when the reverse drive range is selected, a brake band assembly may be actuated frictionally to engage the carrier assembly, and restrain it against rotation, so that torque applied to the sun gear will turn the internal gear in the opposite direction in order to reverse the rotational direction of the drive wheels, and thereby reverse the direction of the vehicle itself. The friction band assemblies are normally operated by servo mechanisms, many varieties of which are known to the art, but the present invention does not relate servo mechanisms, and they will not be further described herein.

It should be appreciated that a second friction applying band assembly may also be employed when the engine compression, acting through the transmission, is being employed to effect a braking action. To understand this operation it is desirable to know that in a compound planetary gear set, multiple planetary gear sets may be employed, and adjacent planetary gear sets may utilize sun gears fabricated in one piece. A sprag assembly is frequently employed selectively to preclude the common sun gears from rotating in one direction.

Adjacent planetary gear sets also generally connect the carrier of the first set to the internal gear of the second set. To make the two planetary gear sets effective a roller clutch assembly is generally employed to restrain the carrier of the second set against rotation in at least one direction.

To provide a means of connecting and disconnecting the power output from a torque converter to the transmission gear train, a clutch assembly is generally employed. Typically, a clutch assembly includes a clutch housing which is splined to the input shaft. A series of torque plates are connected, as by tangs, to the clutch housing, and a second series of torque plates are connected, also by tangs, to a clutch hub member. An actuating piston is hydraulically operated frictionally to lock the torque plates together, and a release spring is employed to retract the piston when the hydraulic pressure is released. By effecting a spline connection between the main transmission shaft and the clutch hub member, whenever hydraulic pressure is supplied to the clutch assembly the input shaft directly rotates the main transmission shaft. When the hydraulic pressure is released, the clutch assembly disengages the aforesaid drive connection, and the transmission is in neutral.

A similar clutch arrangement may also be employed selectively to connect the outer race of a sprag to the transmission housing. When the outer race of the sprag is so connected to the housing, the sprag is effective in securing the sun gear connected to the sprag against rotation, and the power output from the torque converter is received by the transmission output shaft at the gear reduction ratio associated with "second" gear.

A third such clutch arrangement is generally employed to lock the pinions of the adjacent planetary gear set together so that they act as wedges to allow the two adjacent planetary gear sets to rotate as one unit. In this arrangement the power output from the torque converter is received by the transmission output shaft in what is designated as "third" gear.

Actuation of the first and third described clutch arrangements is generally effected when the operator selects the "reverse" range of operation.

Accordingly, it is apparent that the piston assembly by which the aforesaid clutch arrangements are actuated are of significant importance to the operation of such a transmission. However, under current practice the actuating piston reciprocates within a finely machined piston chamber provided within the housing of the transmission in order that the seals carried on each piston can cooperate with those finely machined surfaces to effect the requisite sealing effect along the piston during its full stroke.

Transmission cases have historically been, and continue to be, metallic castings. Castings do, on occasion, incorporate voids, but even microscopic voids, which are likely to be considered as determining the porosity of the casting, can be adversely located, and can be of such localized abundance, that when the casting is machined one or more of the machined surfaces will prove to be unacceptable for the intended purpose of those surfaces. As should be readily apparent, the structural properties of strength and hardness required to make an acceptable transmission case are not necessarily conducive to providing a readily machinable casting. In fact, variations in the section thickness of a casting, and particularly a casting having the complexity of a transmission case, can cause localized hard, or soft, spots. Although one might ideally desire a more homogenous casting, such localized variations in the physical properties of the casting may not themselves negate the suitability thereof to serve as a transmission case. Unfortunately, however, such localized variations can adversely affect the ability of the casting to be acceptably machined.

For example, the reaction of a machine tool against a localized hard spot can cause microscopic, if not macroscopic, grooves which could well preclude the effective sealing of the pressure chamber required between the prior known actuating piston and the chamber formed within the transmission housing, and such flaws might not be identified until after at least partial assembly of the transmission. But even if the flaw were to be detected at the earliest possible opportunity, the result would be a rejected transmission case.

In today's highly automated production facilities the rejection of components, and particularly major components, can not only severely increase the cycle time required to deliver that component to the assembly line but can also significantly increase the cost of that particular component.

Inasmuch as three actuating piston assemblies are normally employed in a typical automatic transmission which employs compound planetary gear sets, it becomes rather apparent that the potential for possible rejection as the result of machining the cast transmission housing is magnified by the prior known actuating piston assemblies.

SUMMARY OF THE INVENTION

It is, therefore, a primary object of the present invention to provide an improved actuating piston assembly that will permit a significant reduction in the complexity of the transmission case with which the actuating piston assembly is to be employed.

It is a another object of the present invention to provide an improved actuating piston assembly, as above, which will permit a reduction in the machining operations required to prepare a transmission case for having the improved actuating piston assembly operatively employed therewith and thereby reduce the scrap rate for cast transmission cases and concomitantly reduce the cycle time for the production of such transmission cases.

It is a further object of the present invention to provide an improved actuating piston assembly, as above, wherein leakage of hydraulic fluid is virtually eliminated in view of the minimal machining required to effect installation thereof.

It is still another object of the present invention to provide an improved actuating piston assembly, as above, which permits servicing of the seals and the piston independently.

It is yet another object of the present invention to provide an improved actuating piston assembly, as above, which may employ a piston that need not be machined in order to reduce problems, and costs, related to machining components of the assembly even further.

It is a still further, and important, object of the present invention to provide an improved actuating piston assembly, as above, which incorporates a novel and unique seal retainer that is configured to adapt itself to being mounted in a physical environment which is subjected to a wide range of operating temperatures without inducing deleterious stresses in either the seal retainer or the member upon which the seal retainer is mounted, even though the seal retainer and the member upon which the seal retainer is mounted are made of different materials having widely disparate coefficients of thermal expansion.

It is yet a further object of the present invention to provide a seal retainer, as above, which may be fabricated in a unique structural configuration which permits it to be secured in operative position by frictional engagement without the need for extraneous fasteners, even though the seal retainer and the member upon which it is mounted are made of materials having disparate coefficients of thermal expansion and even though the combination is operated in an environment having a wide temperature range.

It is an even further object of the present invention to provide an improved actuating piston assembly, as above, wherein the seal retainer which secures the sealing means in operative engagement with the piston is constructed such that the frictional engagement by which the seal retainer is normally secured to its supporting member may be assisted by the biasing pressure of the spring means which retracts the piston when the assembly is not actuated and by the hydraulic pressure which drives the piston itself when the piston assembly is actuated.

These and other objects of the invention, as well as the advantages thereof over existing and prior art forms, which will be apparent in view of the following detailed specification, are accomplished by means hereinafter described and claimed.

In general, an actuating piston assembly embodying the concepts of the present invention employs a unique seal retainer which cooperates with sealing means to fix their position with respect to a relatively movable piston which may also be of unique configuration.

The seal retainer is annular and preferably includes a substantially planar, annular web portion having an outer periphery and an inner boundary. In the preferred embodiment of the present invention an outer rim is presented from the outer periphery and is disposed substantially perpendicularly from said web portion, and an inner rim, which is also disposed substantially perpendicularly from said web portion, is presented from the inner boundary such that the inner and outer rims are substantially concentric. It should also be appreciated that the rims need not, as is preferred, be presented from a common web portion. A plurality of circumferentially spaced, blocking flanges extend radially outwardly from the outer rim, and a plurality of circumferentially spaced, blocking flanges extend radially inwardly from the inner rim.

The aforesaid seal retainer may be mounted on an annulus which has cylindrical surfaces that may be frictionally engaged by the concentric rims on the seal retainer ring.

An annular piston may also be employed, and the annular piston preferably has a U-shaped cross section with a base portion and a pair of radially spaced, inner and outer skirt portions which engage the sealing means.

One exemplary embodiment of an actuating piston assembly particularly adapted for use in conjunction with a torque transmitting system an deemed sufficient to effect a full disclosure of the subject invention is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
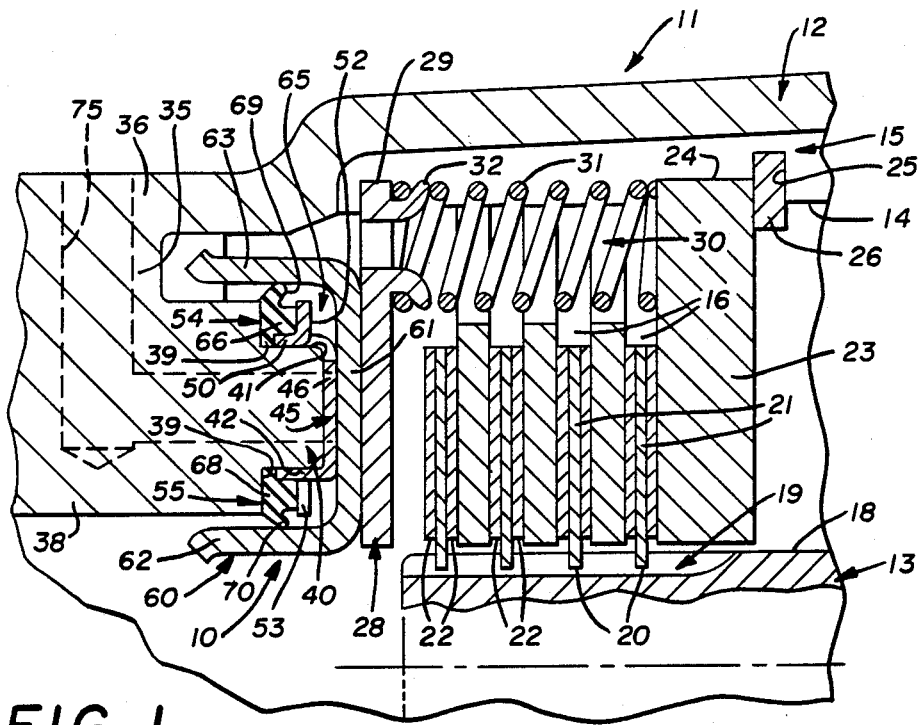
FIG. 1 is a cross section through a torque transmitting system which incorporates the novel and unique seal retainer employed within an actuating piston assembly embodying the concepts of the present invention to secure the necessary seals employed to define a piston chamber between the seal retainer and a piston, the components of the piston assembly being depicted to permit relative rotation between the friction disks in the torque transmitting system.

One representative form of an actuating piston assembly for a torque transmitting system embodying the concepts of the present invention is designated generally by the numeral 10 on the accompanying drawings.

To facilitate the disclosure of the present invention the actuating piston assembly 10 will be described in conjunction with a torque transmitting system 11 in the nature of a vehicular transmission. As such, the torque transmitting system 11 is interposed between two relatively rotatable members 12 and 13. The member 12 may, for example, comprise an outer housing which may either be rotatable or fixed. The member 13 may comprise an inner hub which is generally rotatable. Whereas at least one of the members 12 or 13 is rotatable, it must be understood that the other member 13 or 12 may be either rotatable or fixed. That is, the actuating piston assembly 10 may be employed either in conjunction with a clutch mechanism or a brake mechanism.

In the example depicted, the radially inner surface 14 of the housing member 12 may be axially slotted, as at 15, to receive the tangs (not shown) of a plurality of first, annular torque plates 16 and thereby assure that the first torque plates 16 are not relatively rotatable with respect to the housing member 12, irrespective of whether the housing member 12 is itself rotatable or fixed. To assure that the interaction between the housing member 12 and the tnngs is sufficient to withstand the loading to which the tangs will be subjected, a plurality of axial slots 15 are employed at circumferentially spaced intervals about the inner surface 14, and each of the first torque plates 16 are provided with a sufficient number of tangs to interact with those slots 15, as is well known to the art.

Similarly, the radially outer surface 18 of the hub member 13 may also be axially slotted, as at 19, at circumferentially spaced intervals about the outer surface 18 to receive the several tangs 20 which extend radially inwardly from each of the plurality of second, annular torque plates 21 and thereby assure that the second torque plates 21 will not rotate relative to the hub member 13, as is also well known to the art.

An annular friction disk 22 is interposed between each successive first and second torque plate 16 and 21. To assure that the several friction disks 22 will not be displaced when they are not compressed between the successive first and second torque plates 16 and 21, each friction disk 22 is preferably secured to one of the torque plates 16 and 21 between which it is sandwiched. As is well known to the art, the friction disks 22 may be bonded to either the first or second torque plates 16 or 21 by a suitable adhesive An annular backing plate 23 is also preferably provided with a plurality of tangs 24 which extend radially outwardly therefrom to be received within the same axial slots 15 in the housing member 12 that receive the tangs on the first torque plates 16. A recess 25 is incised circumferentially within the radially inner surface 14 of the housing member 12 to receive a C-ring 26, or the like, to preclude axial displacement of the backing plate 23 away from the first and second torque plates 16 and 21, respectively, as will hereinafter be more fully discussed.

Figure 2:
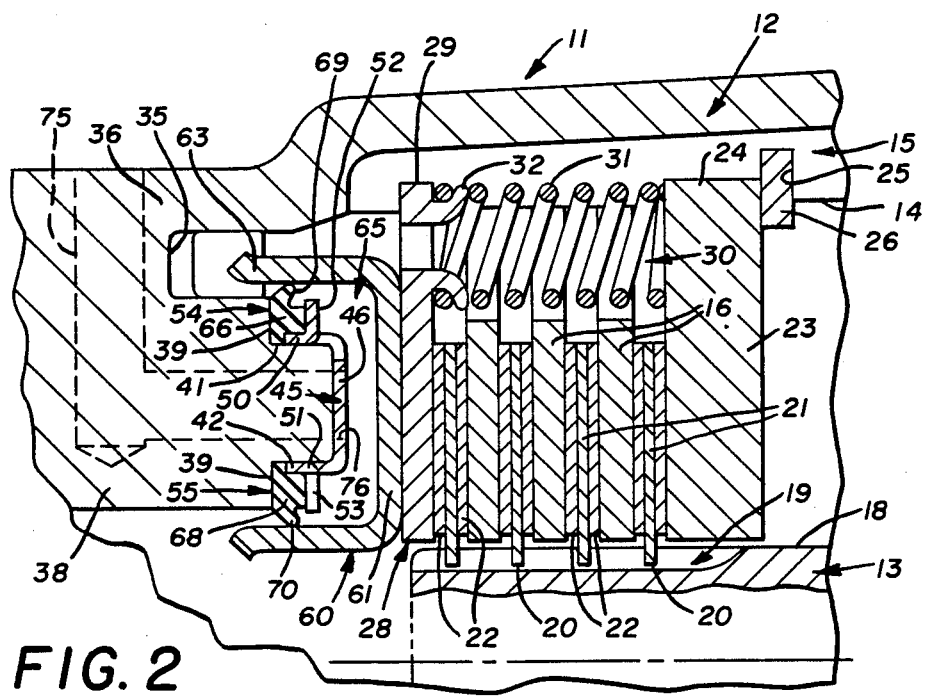
FIG. 2 is a view similar to FIG. 1 but with the components of the piston assembly being depicted to preclude relative rotation between the friction disks in the torque transmitting system; and, FIG. 3 is a perspective view of the novel and unique seal retainer employed in the torque transmitting system depicted in FIGS. 1 and 2.

An annular pressure plate 28 may be similarly provided with a plurality of tangs 29 which extend radially outwardly therefrom to be received within the same axial slots 15 in the housing member 12 that receive the tangs on the torque plates 16 and the tangs 24 on the backing plate 23. The pressure plate 28 is thus preferably disposed in opposition to the backing plate 23, with the series of first and second torque plates 16 and 21, respectively, sandwiched therebetween, as depicted in FIGS. 1 and 2.

At spaced intervals circumferentially about the pressure plate 28 a passage 30 extends between the backing plate 23 and the pressure plate 28. A portion of the passage 30 is recessed into the housing member 12, and the opposed portion of the passage 30 is recessed into the stacked first and second torque plates 16 and 21, respectively. A release spring 31 extends through the passage 30. One or more of the passages 30 may coincide with certain of the slots 15, but as depicted, at those locations where a passage 30 coincides with a slot 15, the tangs on the torque plate 16 are absent in order to allow an unobstructed space within the passage 30 for the spring 31. It is for this reason that the tangs on the torque plates 16 are not depicted in FIGS. 1 and 2. It should also be appreciated that there must be a sufficient number of slots 15 which do not coincide with the passages 30 so that the necessary torque transfer can be effected between the torque plates 16 and the housing member 12.

A flared eye 32 on the pressure plate 28 may be provided to anchor one end of the compression release spring 31 that is received within each passage 30. The opposite end of each release spring 31 biasingly engages the backing plate 23, and as such the backing plate 23 is maintained in fixed engagement with the C-ring 26 and the first and second series of torque plates 16 and 21 are normally permitted to rotate, the first series with respect to the second series.

The actuating piston assembly 10 drives the pressure plate 28 against the interleaved series of first and second torque plates 16 and 21 until they bottom against the backing plate 23. When the first and second series of torque plates 16 and 21 are thus firmly sandwiched between the backing and pressure plates 23 and 28, respectively, the friction plates 22 preclude relative rotation between the torque plates 16 and 21 such that relative rotation between the housing member 12 and the hub member 13 is thereby also precluded.

Turning now to a description of the actuating piston assembly 10, a circumferential rib 35 extends radially inwardly from the wall 36 of the housing member 12 and terminates in a shoulder 38 which extends transversely outwardly beyond the rib 35. The shoulder 38 terminates in stop surface 39, and a mounting annulus 40 extends outwardly beyond the stop surface 39. The mounting annulus 40 has a radially outer, cylindrical surface 41 and a radially inner, cylindrical surface 42 which are substantially concentric.

Figure 3:
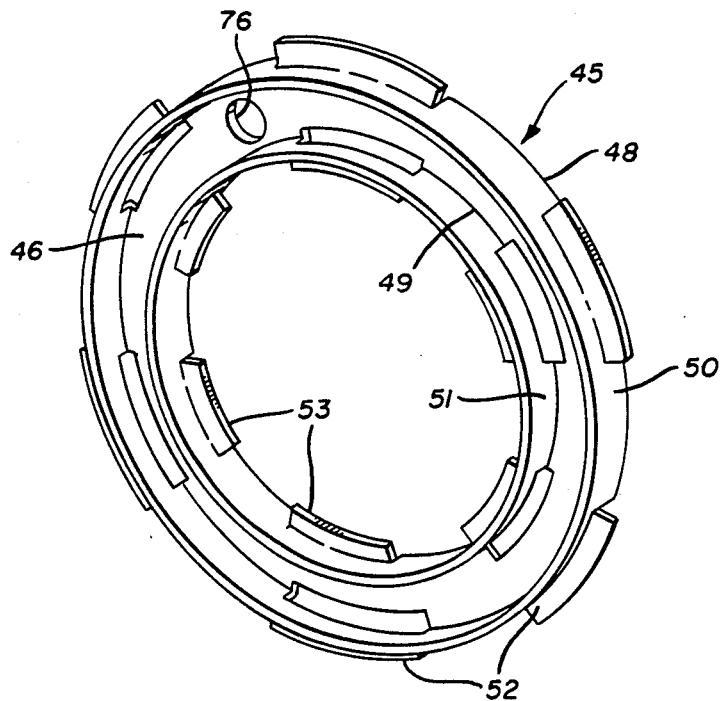

A seal retainer 45 is received on the mounting annulus 40. The preferred form of the seal retainer 45, as best depicted in FIG. 3, has a substantially planar, annular web portion 46 which extends between a radially outer periphery 48 and a radially inner boundary 49. An outer rim 50 is presented from the radially outer periphery 48 of the planar web portion 46 frictionally to engage the cylindrical outer surface 41 on the mounting annulus 40. An inner rim 51 is presented from the radially inner boundary 49 of the web portion 46 frictionally to engage the cylindrical inner surface 42 on the mounting annulus 40. The rims 50 and 51 are thus disposed substantially perpendicularly with respect to the planar web portion 46, or conversely, the web portion 46 is disposed transversely with respect to each rim 50 and 51.

A plurality of circumferentially spaced, outer blocking flanges 52 extend radially outwardly from the outer rim 50, and a plurality of circumferentially spaced, inner blocking flanges 53 extend radially inwardly from the inner rim 51. An outer seal 54, which will be hereinafter more fully described, is secured between the outer blocking flanges 52 and the stop surface 39 on the shoulder 38. An inner seal 55, which will also be hereinafter more fully described, is secured between the inner blocking flanges 53 and the stop surface 39. Although there are a number of ways to provide the blocking flanges 52 and 53, one convenient means is to strike the necessary metal, in part, out of the rim 50 or 51 from which the blocking flange extends, and, in part, out of the adjacent web portion 46, as depicted.

An annular piston 60 is operatively interposed between the pressure plate 28 and the seal retainer 45. As depicted in FIGS. 1 and 2, the piston 60 has a U-shaped cross section with a base portion 61 for applying pressure against the pressure plate 28 which, in turn, drives the pressure plate 28 against the plurality of torque plates 16 and 21 to force them firmly against the backing plate 23 and thereby effect the frictional engagement between the torque plates 16 and 21 which precludes relative rotation between the housing member 12 and the hub member 13.

A pair of radially spaced, inner and outer skirt portions 62 and 63, respectively, engage the corresponding inner and outer seals 54 and 55 to define a piston chamber 65 between said seal retainer 45 and said piston 60.

As depicted, the outer seal 54 has a body portion 66 which is captured between the stop surface 39 on the shoulder 38 adjacent the mounting annulus 40 and the outer blocking flanges 52, and the inner seal 55 similarly has a body portion 68 which is captured between the stop surface 39 and the inner blocking flanges 53. A lip 69 extends radially outwardly from the body portion 66 of the outer seal 54 to engage the outer skirt portion 63 of the piston 60. A similar lip 70 extends radially inwardly from the body portion 68 of the inner seal 53 to engage the inner skirt portion 62 of the piston 60. With the lips 69 and 70 thus engaging the opposed skirt portions 63 and 62, respectively, the integrity of the piston chamber 65 between the seal retainer 45 and the piston 60 is thereby assured.

A conduit 75 communicates from a source of fluid pressure (not shown) through the housing wall 36, the rib 35 and the shoulder 38 to open through an access aperture 76 (FIG. 3) which penetrates the web portion 46 of the seal retainer 45 and which aligns with the conduit 75 to permit ingress and egress of pressure fluid to and from the piston chamber 65.

As previously described herein, the preferred form of the seal retainer 45 utilizes a continuous, single web portion 46 which extends between the outer and inner rims 50 and 51. This configuration provides a unique ability for the seal retainer 45 to be frictionally secured to the mounting annulus 40 without the need for extraneous fastening means. It should be understood that even though extraneous fastening means are not required, an actuating piston assembly embodying the concepts of the present invention would permit the use of additional fastening means, if desired.

With reference again to the preferred form of the seal retainer 45, the configuration thereof permits frictional mounting of the retainer to be accomplished without incurring deleterious stresses within the seal retainer 45 or the mounting annulus 40 to which it is frictionally secured, even though the environment within which those structural components operate might well subject them to a wide range of temperatures and even though the seal retainer 45 and the mounting annulus 40 may be made of materials having widely disparate coefficients of thermal expansion. Typically, the mounting annulus 40 will likely be made of aluminum, and the seal retainer 45 will likely be made of steel, and, in the environment of a vehicular transmission, the temperature range may well vary from about −20fF. to approximately 300fF.

By having the outer and inner rims 50 and 51, respectively, presented from a common web portion 46 as an integral whole, a press fit of only one rim 50 or 51 onto the mounting annulus 40 is all that is required to secure the seal retainer 45 operatively into the mounting annulus 40. Thus, with aluminum having approximately twice the coefficient of thermal expansion of steel, if the inner rim 51 frictionally engages the inner surface 42 on the mounting annulus 40 within the lower portion of the temperature range, the outer rim 50 will frictionally engage the outer surface 41 of the mounting annulus 40 within the upper portion of the temperature range.

It is, of course, possible to have each rim presented from an independent web portion, but in that situation the gauge of the metal from which the independent rims and web portions are fatricated must be sufficient to withstand the significant stresses created by the circumferential engagement of the structural components made from materials having significantly different coefficients of thermal expansion when those components are subjected to operating environments having relatively wide temperature ranges. Moreover, if the rims 50 and 51 are presented from independent web portions, the inner rim 51 may, as depicted, frictionally engage the mounting annulus 40, but the outer rim 50 may engage a separate mounting surface, not shown, presented from the wall 36 of the housing member 12.

As should now be apparent, the present invention not only provides an actuating piston assembly that is particularly suited for use with torque transmitting systems but which also accomplishes the other objects of the invention.

The embodiments of the invention in which an exclusive property or privilege is claimed are defined as follows:

1. A seal retainer for securing sealing means in cooperative interaction with an actuating piston in a friction disk, torque transmitting system, said seal retainer comprising:
   a substantially planar, annular web portion having a radially outer periphery and a radially inner boundary;
   an outer rim presented from the radially outer periphery of said planar web portion, said outer rim being disposed substantially perpendicularly with respect to said planar web portion;
   an inner rim presented from the radially inner boundary of said planar web portion, said inner rim being disposed substantially perpendicularly with respect to said planar web portion to be oriented substantially concentrically of said outer rim;
   a plurality of circumferentially spaced blocking flanges extending radially outwardly from said outer rim; and,
   a plurality of circumferentially spaced blocking flanges extending radially inwardly from said inner rim.

2. A seal retainer ring in combination with sealing means disposed for cooperative interaction between a housing encasing a torque transmitting system and an actuating piston in a friction disk, torque transmitting system, said combination comprising:
   a mounting annulus presented from the housing;
   said mounting annulus having a radially outer, cylindrical surface and a radially inner, cylindrical surface;
   said radially outer and said radially inner cylindrical surfaces on said mounting annulus being substantially concentric;
   a retainer;
   said retainer having a substantially planar, annular web portion;
   said web portion having a radially outer periphery and a radially inner boundary;
   an outer rim presented from the radially outer periphery of said planar web portion fictionally to engage said radially outer cylindrical surface on said mounting annulus;
   an inner rim presented from the radially inner boundary of said planar web portion frictionally to engage said radially inner cylindrical surface on said mounting annulus;
   a plurality of circumferentially spaced outer blocking flanges extending radially outwardly from said outer rim;
   a plurality of circumferentially spaced inner blocking flanges extending radially inwardly from said inner rim;
   an outer seal secured to said mounting annulus by said outer blocking flanges, said outer seal extending radially outwardly beyond the outermost extent of said outer blocking flanges; and,
   an inner seal secured to said mounting annulus by said inner blocking flanges, said inner seal extending radially inwardly beyond the innermost extent of said inner blocking flanges.

3. An actuating piston assemble for a friction disk, torque transmitting system comprising:
   a housing encasing the torque transmitting system;
   a stop surface presented from said housing;
   a mounting annulus presented from the housing and extending substantially perpendicularly outward from said stop surface;
   said mounting annulus having a radially outer, cylindrical surface and a radially inner, cylindrical surface;
   said radially outer and said radially inner cylindrical surfaces on said mounting annulus being substantially concentric;
   a seal retainer;
   said seal retainer having a substantially planar, annular web portion;
   said web portion having a radially outer periphery and a radially inner boundary;
   an outer rim presented from the radially outer periphery of said planar web portion frictionally to engage said radially outer cylindrical surface on said mounting annulus;
   an inner rim presented from the radially inner boundary of said planar web portion frictionally to engage said radially inner cylindrical surface on said mounting annulus;
   a plurality of circumferentially spaced, outer blocking flanges extending radially outwardly from said outer rim;
   a plurality of circumferentially spaced, inner blocking flanges extending radially inwardly from said inner rim;
   an outer seal secured between said stop surface on said housing and said outer blocking flanges, said outer seal extending radially outwardly beyond the outermost extent of said outer blocking flanges;
   an inner seal secured between said stop surface on said housing and said inner blocking flanges, said inner seal extending radially inwardly beyond the innermost extent of said inner blocking flanges;
   an annular piston having a U-shaped cross section with a base portion for applying pressure to the friction elements within the torque transmitting system; and,
   a pair of radially spaced, inner and outer skirt portions presented from said base portion and engaging said inner and outer seals, respectively, to define a piston chamber between said seal retainer and said annular piston.

4. An actuating piston assembly for a friction disk, torque transmitting system comprising:
   a housing encasing the torque transmitting system;
   at least one stop surface and at least one mounting surface presented from said housing;
   at least one seal retainer;
   said seal retainer having at least one annular rim frictionally to engage said mounting surface;
   a substantially planar, annular web portion secured to said annular rim and being disposed transversely with respect thereto;

a plurality of circumferentially spaced, blocking flanges extending radially from said annular rim;

a seal secured between said stop surface on said housing and said blocking flanges, said seal extending radially beyond the extent of said blocking flanges;

a piston having a base portion for applying pressure to the friction elements within the torque transmitting system; and, at least one skirt portion presented from said base portion and engaging said seal to define a piston chamber between said seal retainer and said piston.

5. An actuating piston assembly, as set forth in claim 4, wherein:

a mounting annulus is presented from said housing and extends substantially perpendicularly outward from said stop surface; and, said mounting annulus has at least one cylindrical surface.

* * * * *